US008789212B2

(12) United States Patent
Cleva

(10) Patent No.: US 8,789,212 B2
(45) Date of Patent: *Jul. 29, 2014

(54) PROTECTIVE ATHLETIC HEADWEAR WITH OPEN TOP

(71) Applicant: Robert E. Cleva, Port Washington, NY (US)

(72) Inventor: Robert E. Cleva, Port Washington, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/840,991

(22) Filed: Mar. 15, 2013

(65) Prior Publication Data

US 2013/0212784 A1 Aug. 22, 2013

Related U.S. Application Data

(63) Continuation-in-part of application No. 13/692,757, filed on Dec. 3, 2012, now Pat. No. 8,713,717, which is a continuation-in-part of application No. 13/362,834, filed on Jan. 31, 2012, now Pat. No. 8,458,820, which is a continuation-in-part of application No. 13/231,434, filed on Sep. 13, 2011, now Pat. No. 8,347,419.

(60) Provisional application No. 61/580,949, filed on Dec. 28, 2011, provisional application No. 61/584,896, filed on Jan. 10, 2012.

(51) Int. Cl.
*A42B 3/00* (2006.01)

(52) U.S. Cl.
USPC ............. 2/413; 2/414; 2/410; 2/425; 2/171.5; 2/171

(58) Field of Classification Search
USPC .......... 2/413, 414, 418, 410, 425, 423, 175.1, 2/171.6, 171.8, 181.4, 173, 175.6, 209, 2/209.13, 171, 195.3
See application file for complete search history.

(56) References Cited

U.S. PATENT DOCUMENTS

| 1,187,656 A | 6/1916 | Sargent |
| 2,926,356 A | 3/1960 | Taylor |

(Continued)

FOREIGN PATENT DOCUMENTS

| EP | 0048442 | 3/1982 |
| GB | 2389299 | 12/2003 |

(Continued)

OTHER PUBLICATIONS

Auction of "Brooklyn Dodgers Cap Attributed to Jackie Robinson—With Custom Protective Inserts", http://www.scpauctions.com, SCP Auctions, Nov. 2010, Internet Auction.

(Continued)

*Primary Examiner* — Khoa Huynh
*Assistant Examiner* — Andrew W Collins
(74) *Attorney, Agent, or Firm* — Hoffmann & Baron, LLP

(57) ABSTRACT

Provided is protective athletic headwear that includes a body, band and protective inserts. The body has a first opening and a second smaller opening. The pocket band extends about the first opening to the interior of the body and partially toward the second opening. The band is free floating with respect to the body and configured to fit the head of the person. Further, the band includes pockets disposed about a base stitching that secure the band to the body. The protective inserts are configured to be received into pockets to provide a protective function to the head of the person. The protective inserts are disposed adjacently to one another about the band and extend from the base stitching of the band partially toward the second opening such that the body encloses the protective inserts in the band.

18 Claims, 4 Drawing Sheets

(56) References Cited

U.S. PATENT DOCUMENTS

| | | | |
|---|---|---|---|
| 3,872,511 A | 3/1975 | Nichols | |
| 4,441,211 A | 4/1984 | Donzis | |
| 4,566,137 A | 1/1986 | Gooding | |
| 4,586,200 A | 5/1986 | Poon | |
| 5,405,312 A | 4/1995 | Jacobs | |
| RE35,193 E | 4/1996 | Shifrin | |
| 5,615,415 A | 4/1997 | Beckerman | |
| 5,661,854 A | 9/1997 | March, II | |
| 5,720,051 A | 2/1998 | Johnson | |
| 5,729,830 A | 3/1998 | Luhtala | |
| 5,815,846 A | 10/1998 | Calonge | |
| 5,882,205 A | 3/1999 | Peterson | |
| 5,890,232 A | 4/1999 | Park | |
| 5,913,412 A | 6/1999 | Huber et al. | |
| 5,946,734 A | 9/1999 | Vogan | |
| 6,012,162 A | 1/2000 | Bullat | |
| 6,065,158 A | 5/2000 | Rush, III | |
| 6,073,271 A | 6/2000 | Alexander et al. | |
| 6,122,785 A | 9/2000 | Bondie et al. | |
| 6,131,196 A | 10/2000 | Vallion | |
| 6,175,967 B1 | 1/2001 | Donzis | |
| 6,178,560 B1 | 1/2001 | Halstead et al. | |
| 6,226,801 B1 | 5/2001 | Alexander et al. | |
| 6,253,376 B1 | 7/2001 | Ritter | |
| 6,282,724 B1 | 9/2001 | Abraham et al. | |
| 6,397,399 B1 * | 6/2002 | Lampe et al. | 2/425 |
| 6,427,253 B1 * | 8/2002 | Penny | 2/412 |
| 6,438,761 B1 | 8/2002 | McGarrity | |
| 6,493,881 B1 | 12/2002 | Picotte | |
| 6,811,463 B2 | 11/2004 | Martz | |
| 6,904,617 B2 | 6/2005 | Tsai | |
| 7,089,602 B2 | 8/2006 | Talluri | |
| 7,213,271 B1 | 5/2007 | Bielefeld | |
| 7,234,174 B2 * | 6/2007 | Abraham | 2/425 |
| 7,673,350 B2 | 3/2010 | Mazzoccoli et al. | |
| 7,900,271 B2 | 3/2011 | Sonner | |
| 7,937,778 B1 | 5/2011 | Norton | |
| 2001/0032351 A1 | 10/2001 | Nakayama et al. | |
| 2001/0034895 A1 | 11/2001 | Ikeda | |
| 2003/0233697 A1 | 12/2003 | Tsai | |
| 2004/0093658 A1 | 5/2004 | Jackson | |
| 2005/0241048 A1 | 11/2005 | Cattaneo | |
| 2006/0059606 A1 | 3/2006 | Ferrara | |
| 2007/0056081 A1 | 3/2007 | Aspray | |
| 2007/0094769 A1 | 5/2007 | Lakes et al. | |
| 2007/0190292 A1 | 8/2007 | Ferrara | |
| 2008/0250548 A1 | 10/2008 | Stuhmiller et al. | |
| 2009/0265839 A1 | 10/2009 | Young et al. | |
| 2010/0167042 A1 | 7/2010 | Ervasti | |
| 2010/0192290 A1 | 8/2010 | Husain | |
| 2011/0203036 A1 | 8/2011 | Turner et al. | |

FOREIGN PATENT DOCUMENTS

| | | |
|---|---|---|
| GB | 2423006 | 8/2006 |
| WO | 2005000057 A2 | 1/2005 |

OTHER PUBLICATIONS

International Search Report and Written Opinion issued in PCT/US2012/020794 on May 2, 2012.

European Search Report issued in EP 12718556 on Jun. 19, 2013.

* cited by examiner

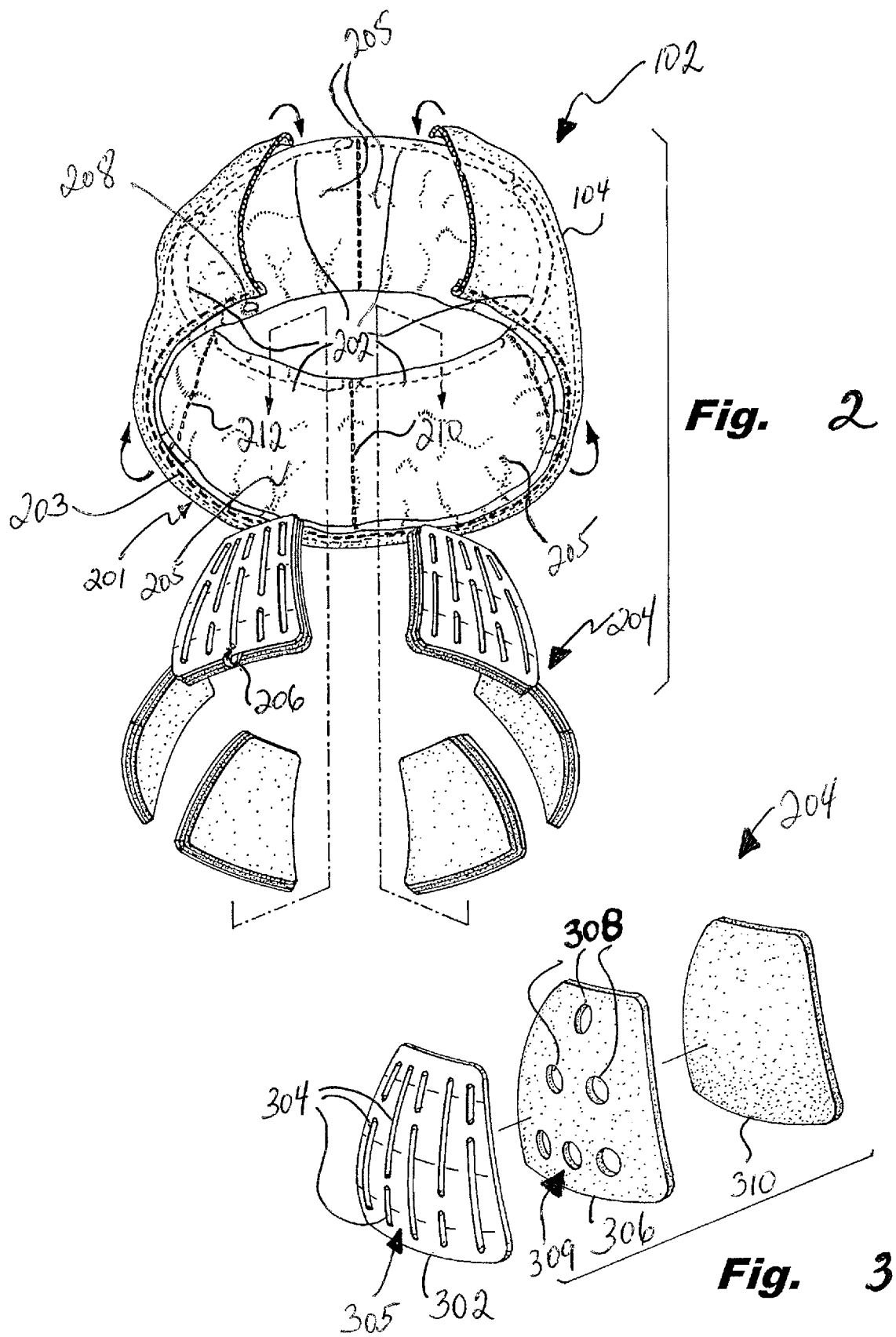

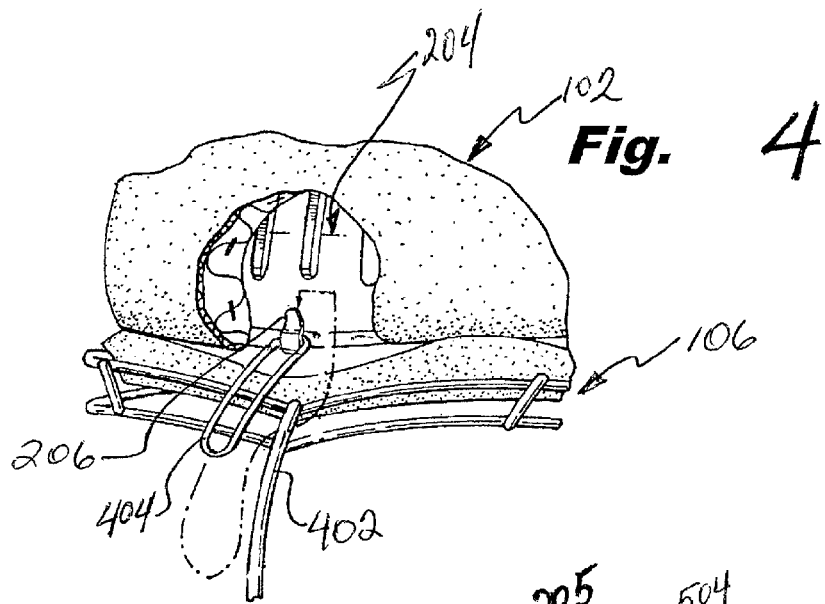
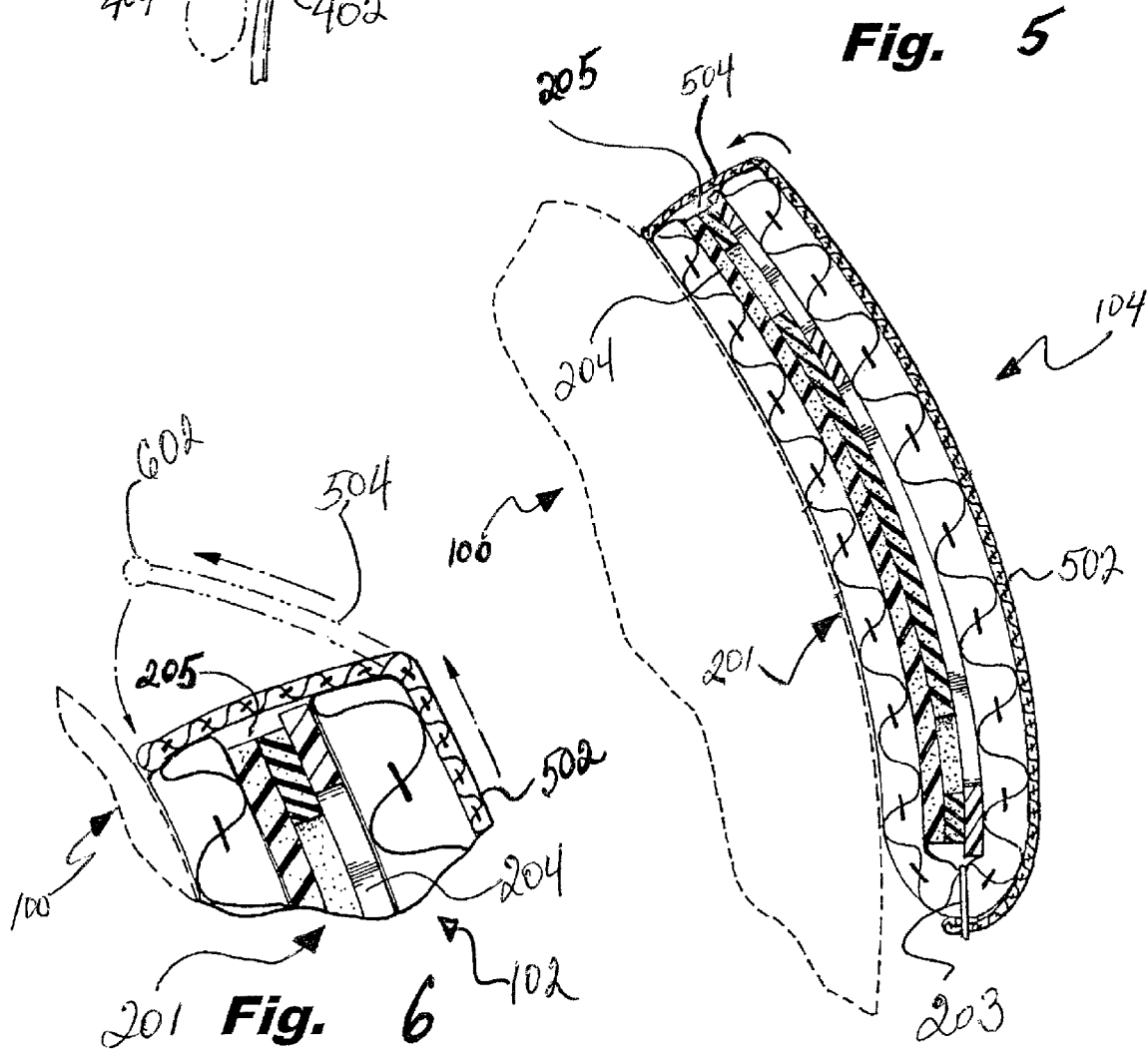

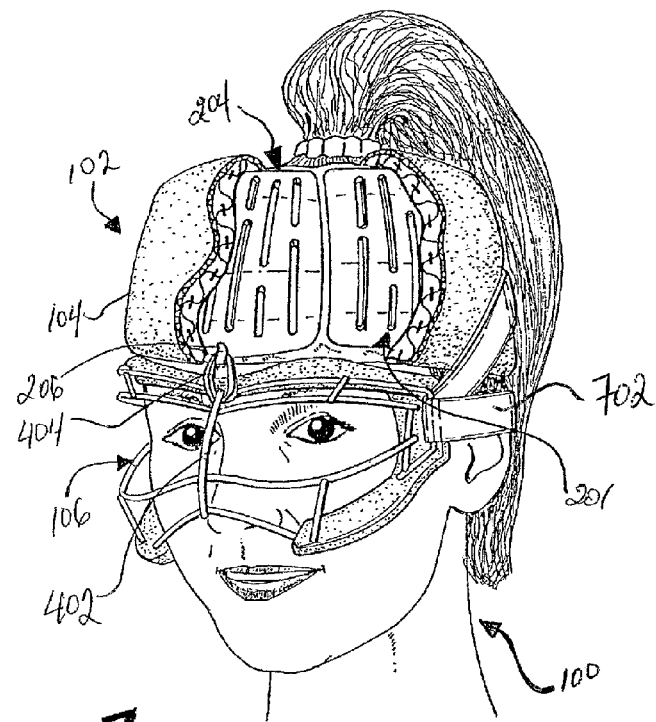
Fig. 7
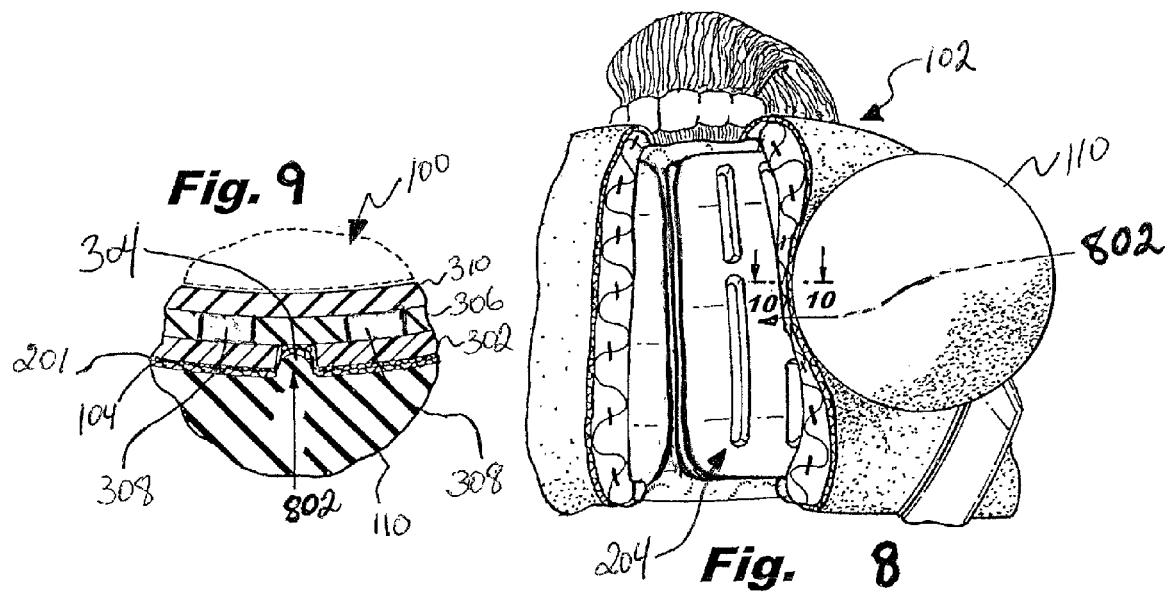
Fig. 9
Fig. 8

PROTECTIVE ATHLETIC HEADWEAR WITH OPEN TOP

CROSS-REFERENCE TO RELATED APPLICATION

This application is a continuation-in-part of U.S. patent application Ser. No. 13/692,757 filed Dec. 3, 2012, which is a continuation-in-part of U.S. patent application Ser. No. 13/362,834, filed on Jan. 31, 2012, which is a continuation-in-part of U.S. patent application Ser. No. 13/231,434, filed on Sep. 13, 2011, which are is incorporated herein by reference in their entireties. U.S. patent application Ser. No. 13/362,834 claims priority to U.S. Provisional Patent Application No. 61/580,949, filed on Dec. 28, 2011, and U.S. Provisional Patent Application No. 61/584,896, filed on Jan. 10, 2012, both of which are also incorporated herein by reference in their entireties.

BACKGROUND

1. Field

The present application relates to athletic headwear. More specifically, the present application is directed to a protective athletic headwear with an open top and a method of manufacturing the protective athletic headwear with an open.

2. Brief Discussion of Related Art

Protective athletic (e.g., sports-related) headwear can include helmets, headgear and other types of protective athletic headwear, which provide a protective function (e.g., various levels of protection) against head injuries resulting from various impacts to the head associated with accidents and/or intentional acts of others. Protective athletic headwear can be used for various athletic-related activities ranging from sports activities (e.g., lacrosse) through to leisure activities (e.g., biking, running). The different activities can require different levels of protection and accordingly different headwear.

In many circumstances, head injuries can be prevented by using protective athletic headwear. While athletic-related head injuries can be very serious and even life threatening, some people (e.g., especially young people) may prefer not wear headwear for various reasons, including aesthetics, comfort, application/activity-specific fit, expense, etcetera. Other reasons may exist, such as protective athletic headwear is not required by particular sports leagues or bodies.

The foregoing and other reasons or factors can cause some people to go without protective athletic headwear and increase the potential for serious head injuries. Accordingly, protective athletic headwear should aim to not only to provide a protective function but should also aim to provide an inexpensive, yet aesthetic, comfortable and secure fit such that users would desire to wear the protective athletic headwear. While providing the protective function, existing protective athletic headwear frequently misses the mark and does not provide an aesthetic, comfortable and application-specific fit that is inexpensive, causing people to go without protective athletic headwear and increasing the potential for serious head injuries.

Fit and positioning of headwear are essential to effectiveness at reducing head injury. In this regard, stretchable athletic headwear offers the form-factor and the convenience of a precise fit and positioning for various head sizes. Stretchable athletic headwear can be made of a various fabrics, including manmade/synthetic materials, natural materials, or blended combinations thereof. Accordingly, stretchable athletic headwear can provide an inexpensive form-factor and esthetic quality, which can result in increased desirability. Desirability cannot be underestimated in people's desire or lack thereof for wearing protective athletic headwear.

However, the method of placing protective materials (protective function) into stretchable athletic headwear while maintaining its aesthetic quality have been problematic. On the one hand, hard layered plastics provide great protection but are too bulky and thus ruin the aesthetics, decreasing desirability and increasing the potential for serious head injuries. On the other hand, simple padding provides great esthetics but does not provide sufficient protection, decreasing the protective function and increasing the potential for serious head injuries. Furthermore, the manufacture of the stretchable athletic headwear that incorporates sufficient protective function has met with challenges.

It is therefore desirable to provide a combination of sufficient protective function and aesthetics such that people will more readily wear protective athletic headwear during their engagement in athletic activities and reduce the potential for serious injuries.

SUMMARY

In accordance with an embodiment, a protective athletic headwear is disclosed. The protective athletic headwear includes a body, a pocket band and a plurality of protective inserts.

The body has a first opening and a second opening opposite the first opening. Moreover, the body is configured to fit a head of a person though the first opening.

The pocket band extends about the first opening to the interior of the body and partially toward the second opening. Further, the pocket band is free floating with respect to the body and is configured to fit the head of the person. In addition, the pocket band includes a plurality of pockets disposed about a base stitching that secures the pocket band to the body.

The plurality of protective inserts is configured to be received into the plurality of pockets to provide a protective function to the head of the person. The protective inserts are disposed adjacently to one another about the pocket band and extend from the base stitching of the pocket band partially toward the second opening such that the body encloses the protective inserts in the pocket band.

In accordance with a further embodiment, a protective insert to be received into a pocket of a protective athletic headwear is disclosed. The protective insert includes an outer layer that is rigid or semi-rigid, and at least one pliable middle layer and a pliable inner layer.

The outer layer is configured to provide impact-resistance. The at least one pliable middle layer has at least one arrangement of openings. The pliable inner layer is configured to provide cushioning. The outer layer, the at least one pliable middle layer and the pliable inner layer are sealed such that the openings form sealed air pockets configured to absorb and distribute an impact to the outer layer about the at least one protective insert.

In accordance with another embodiment, a method of manufacturing protective athletic headwear is disclosed. In accordance with the method, a body having body having a first opening and a second opening that is smaller than the first opening is provided. The body is configured to fit a head of a person though the first opening.

A pocket band is base-stitched to the body such that the pocket band extends about the first opening to the interior of the body and partially toward the second opening. The pocket band is free floating with respect to the body and is configured to fit the head of the person. Moreover, the pocket band includes a plurality of pockets disposed about the base stitching.

A plurality of protective inserts is inserted into the plurality of pockets to provide a protective function to the head of the person. The protective inserts are disposed adjacently to one another about the pocket band and extend from the base stitching of the pocket band partially toward the second opening such that the body encloses the protective inserts in the pocket band.

These and other purposes, goals and advantages of the present application will become apparent from the following detailed description of example embodiments read in connection with the accompanying drawings.

BRIEF DESCRIPTION OF THE DRAWINGS

Some embodiments are illustrated by way of example and not limitation in the figures of the accompanying drawings in which:

FIG. 2 illustrates the construction of the example protective athletic headwear of FIG. 1;

FIG. 3 illustrates the construction of an example protective insert for insertion into a pocket band of FIG. 2;

FIG. 4 illustrates the removable attachment of an example protective insert to an athletic facemask illustrated in FIG. 2;

FIG. 5 illustrates a cross-section of the example protective athletic headwear of FIG. 2 with the protective insert disposed in a pocket of pocket band;

FIG. 6 illustrates an exploded cross-section of the example protective athletic headwear of FIG. 5 with the protective insert disposed in a pocket of pocket band and a body of the protective athletic headwear stretching over to enclose protective insert in the pocket of pocket band;

FIG. 7 illustrates a person wearing the protective athletic headwear of FIG. 1 cutaway to reveal the protective insert in relation to the body of the protective athletic headwear;

FIG. 8 illustrates an impact of a ball to the protective athletic headwear of FIG. 1; and FIG. 9 illustrates a cross-section of the protective insert of FIG. 3 showing an example protective function in response to the impact to the protective athletic headwear as illustrated in FIG. 8.

DETAILED DESCRIPTION

Figure 1:
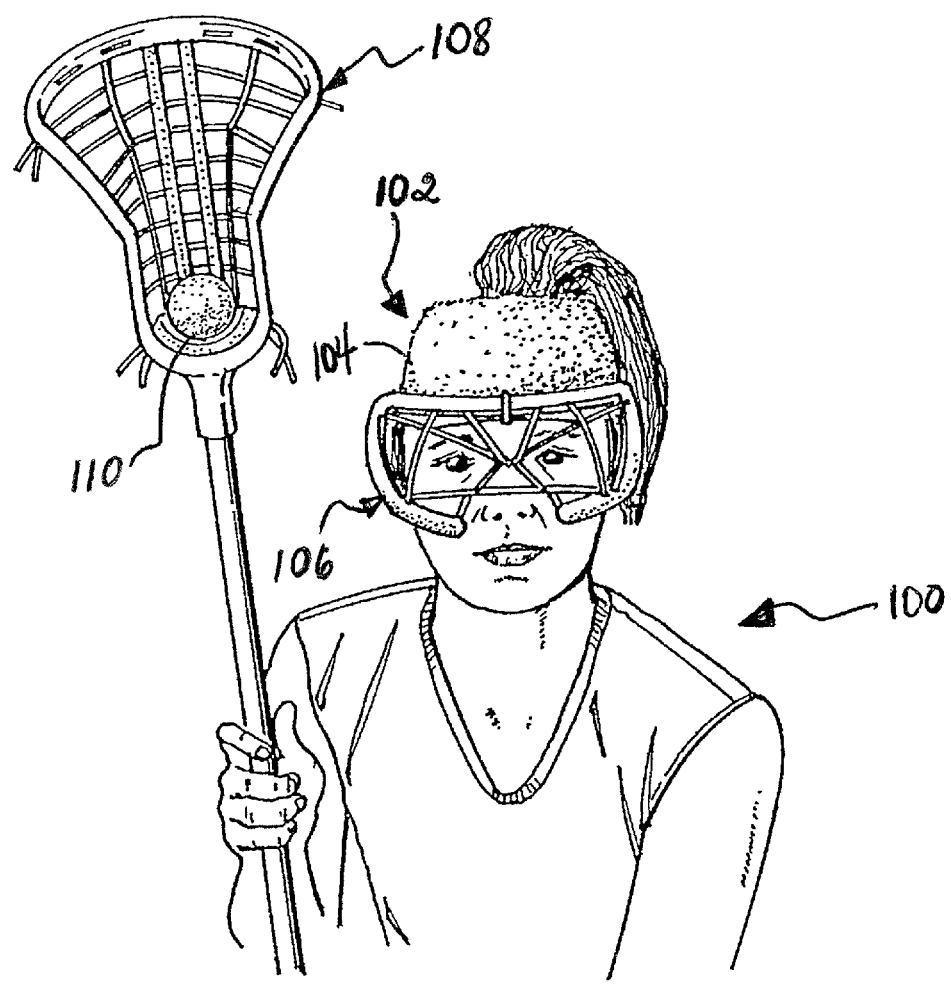
FIG. 1 illustrates a person wearing an example protective athletic headwear having an open top.

A protective athletic headwear with an open top and a method of manufacturing the protective athletic headwear with an open are disclosed herein. In the following description, for the purposes of explanation, numerous specific details are set forth in order to provide a thorough understanding of example embodiments. It will be evident, however, to one skilled in the art, that an example embodiment may be practiced without all of the disclosed specific details.

FIG. 1 illustrates a person 100 wearing an example protective athletic headwear 102. The protective athletic headwear 102 is configured to provide a combination of a significant protective function in an aesthetic form-factor, which improves desirability for wearing the protective athletic headwear 102. More superficially, the protective athletic headwear 102 provides the appearance of an aesthetic stretchable hat with an open top, while at the same time providing a significant protective function, thereby encouraging the use of the protective athletic headwear 102 and reducing the potential for head injuries.

The protective athletic headwear 102, which includes a body 104 and a pocket band as shown in FIG. 2, can be made from manmade/synthetic materials, natural materials, and/or blended combinations thereof. For example, wool, cotton, acrylic, nylon, other natural or synthetic materials, and combinations thereof can be used.

The protective athletic headwear 102 is configured to fit precisely and aesthetically over a person's head, to provide a protective function against head injury (e.g., using protective inserts) resulting from athletic activities in which the person 100 engages, as well as in various embodiments to engage or attach removeably to a facemask. As particularly illustrated in FIG. 1, the protective athletic headwear 102 can fit the head of a player engaging in the game of lacrosse. The player is wearing the protective athletic headwear 102 engaged removeably to a facemask 106. Moreover, the player is holding a lacrosse stick 108 with its netting 108 securing a lacrosse ball 110.

Other athletic activities for which the protective athletic headwear 102 will find implementation can include, for example, rollerblading, biking, hiking, skateboarding, touch football, soccer, field hockey, rock climbing, skiing, snowboarding, and ice-skating, as well as other athletic and leisure activities. The foregoing list of activities is not exhaustive, and people engaged in other athletic and leisure activities that are not enumerated can benefit from the protective function in an aesthetic form-factor provided by the protective athletic headwear 102.

FIG. 2 illustrates the construction of the example protective athletic headwear 102 of FIG. 1. The protective athletic headwear 102 includes a body 104, a pocket band 201 and a plurality of protective inserts 204.

The pocket band 201 is disposed about at least a portion of the interior of the protective athletic headwear 102 and is configured to receive and retain the protective inserts 204 in a predetermined configuration that provides a protective function to the person's head when the person 100 wears the protective athletic headwear 102.

More specifically, the pocket band 201 is secured to the body 104 by and extends from a base stitching 203 of the protective athletic headwear 102 partially towards the vertical extent of the body 104 of the protective athletic headwear 102 such that the protective function can be provided to the head of the person 100. The protective athletic headwear 102—and more particularly the pocket band 201 coupled with protective inserts 204—is configured to at least partially cover the frontal, parietal, temporal and occipital part of the person's head.

As illustrated in FIG. 2, the pocket band 201 is free floating with respect to the body 104 of the protective athletic headwear 102, such that the pocket band 201 can provide application-specific or precise fit and positioning of plural protective inserts 204 for various head sizes to effectively reduce and/or eliminate head injuries, while the body 104 can provide the aesthetic form-fit (e.g., stretching) over the combination of the pocket band 201 and the protective inserts 204.

The pocket band 201 includes a plurality of pockets 205, each of which is configured (e.g., sized and dimensioned) to receive and retain a respective protective insert 204, such that the plurality of protective inserts 204 can be disposed in the predetermined configuration in the pocket band 201 of the protective athletic headwear 102. In some embodiments, six (6) pockets 205 are provided in the pocket band 201. In other embodiments, there can be two (2) to twelve (12) pockets 205 to receive respective protective inserts 204. Fewer or greater number of pockets 205 can be provided in alternate embodiments.

The pockets 205 are disposed adjacently about the pocket band 201 such that the protective inserts 204 can be adjacently disposed (e.g., one next to the other), providing an almost continuous protective function about the protective athletic headwear 102. In some embodiments, the pockets 205 can be equidistantly disposed about the pocket band 201. In other embodiments, the pockets 205 can be disposed at different locations about the pocket band 201 based on the size and dimension of the respective protective inserts to be received into the pockets 205.

The pocket band 201 can be constructed from one folded piece of material with openings 202 provided through about the fold and its ends stitched by the base stitching 203, or can be constructed from separate pieces of material that are stitched by the base stitching 203. As described herein, the side stitchings 210, 212 define respective pockets 205 of the pocket band 201. It should be noted that the pocket band 201 material of either construction can be a single layer (e.g., single ply) or a double layer (e.g., double ply).

The protective inserts 204 are configured to be disposed adjacently to one another in the respective pockets 205 of the pocket band 201, providing an almost continuous protective function about the protective athletic headwear 102. The protective inserts 204 are independently situated or disposed in the respective pockets 205 of the pocket band 201 through openings 202 and can conform to the contours of the person's head as the protective athletic headwear 102 stretches about the person's head. The height of the protective inserts 204 is approximately 3½", while the width can be different and can be based on various considerations, among other things, the circumference of the protective headwear 102 and a total number of protective inserts 204 used in the protective headwear 102 to counter to the person's head. In various embodiments, the height of the protective inserts 204 can also be between about 3" and about 5½", with the width being adjusted based on various considerations, among other things, the circumference of the protective headwear 102 and a total number of protective inserts 204 used in the protective headwear 102 to counter to the person's head.

In various embodiments, the protective inserts 204 are approximately triangular in shape and are truncated (e.g., defining a truncated plane) below a vertex (not shown) of the triangular shape. The protective inserts 204 are further curvilinear (e.g., in vertical and/or horizontal dimensions) such that they conform to the contours of the person's head, which provides an almost continuous protective function about the protective athletic headwear 102. In the vertical dimension, the protective inserts 204 can have a generally uniform curvature, while in the horizontal dimension the curvature of the protective inserts 204 can have one or more portions extending from a base of the triangular shape (side to side) to the truncated plane below the vertex, each portion having different and decreasing radius to conform to the head of the person 100.

In some embodiments, six (6) protective inserts 204 can be provided. In other embodiments, there can be two (2) to twelve (12) protective inserts 204. Fewer or greater number of protective inserts 204 can be provided in alternate embodiments. The protective inserts 204 will be described in greater detail below with reference to FIG. 3. In embodiments in which the protective athletic headwear 102 is to be secured or attached removeably to a facemask 106 (e.g., via a frame member or a strap member of the facemask 106), at least one protective insert 204 includes an engagement device 206 configured to removeably engage a linking element that can couple the protective athletic headwear 102 (via the protective insert 204 and engagement device 206) to the facemask 106, as will be described in greater detail below with reference to FIG. 4.

The protective inserts 204 can be similarly or differently sized and/or dimensioned (e.g., same or different triangularly-shaped and truncated slices) such that the combination of the protective inserts 204 conform to the contours of the person's head, providing an almost continuous protective function about the protective athletic headwear 102. For example, the protective inserts 204 in the front and/or the back of the protective athletic headwear 102 can be wider triangular inserts than the remaining inserts therebetween. Other arrangements are possible of course. The pockets 205 can be adjusted based on the dimensions of the respective protective inserts 204.

The pockets 205 include opening 202 defined by side stitchings 210, 212 and base stitching 203. The openings 202 are configured to receive the protective inserts 204 into the pockets 205 of the pocket band 201. In openings 202 can be disposed at variable distances above the base stitching 203. In some embodiments, the openings 202 can be disposed at a top-most extent of the pocket band 201. In other embodiments, the opening 202 can be disposed to the interior of the pocket band 201.

Other alternatives are possible in which the openings 202 are disposed between the pocket band 201 and the inside of the body 104. This construction can allow easy insertion of the protective insert 204, while hiding the potentially unsightly openings 202 to the interior of the protective athletic headwear 102.

Moreover, the openings 202 are approximately centered in relation to the side stitchings 210, 212. The openings 202 are stretchable in order to receive the protective inserts 204 into the pockets 205. The side stitchings 201, 212 of each pocket 205 extend approximately from the base stitching 203 and along the height of the pocket band 201. Depending on the construction of the pocket band 201 (e.g., one folded piece of material with openings 202 through about the fold and ends stitched by the base stitching 203), the side stitchings 210, 212 can extend partially to the top-most extent of the pocket band 201. If two separate pieces of material that form the pocket band 201 are stitched by the base stitching 203, then the side stitchings 210, 212 can extend fully to the top-most extent of the pocket band 201.

The side stitchings 210, 212 can be straight or angled towards one another for the pockets 205 to approximate and accommodate the angulation of protective inserts 204, such that the protective inserts 204 can be retained in a predetermined configuration with respect to one another in the respective pockets 205 and can provide an almost continuous protective function to the person's head when the person 100 wears the protective athletic headwear 102. For example, the side stitchings 210, 212 can be approximately straight along a first portion of the pocket band 201 from the base stitching 203 and then continue angled toward one another along a second portion toward the top of the pocket band 201 (e.g., approximately ½" inch from the top).

The base stitching 203 extends along the circumference of the pocket band 201 and is configured to provide a base or seat for each of the protective inserts 204, which approximates and accommodates the base of each protective insert 204, such that the protective inserts 204 can be retained in a predetermined configuration with respect to one another in the respective pockets 205 and can provide an almost continuous protective function to the person's head when the person 100 wears the protective athletic headwear 102.

FIG. 3 illustrates the construction of an example protective 204 insert for insertion into a pocket band 201 of FIG. 2. The example protective insert 204 includes a stack of four (3) layers 302, 306, 310. The layers 302, 306, 310 of the protective insert 204 are configured to provide a protective function to the person 100 when wearing the protective athletic headwear 102.

The outermost layer 302 is a durable and rigid plastic configured to provide impact-resistance from impacts which can cause serious trauma to the head of the person 100. For example, the layer 302 can be a thermoplastic, such as a polycarbonate or polymethyl methacrylate (PMMA), or another plastic that is sufficiently rigid yet can deform without cracking or breaking from an impact associated with an accident and/or intentional act of another person. In some embodiments, the outermost layer 302 can be a rigid or a semi-rigid elastomer (or rubber) configured to provide impact-resistance from impacts which can cause serious trauma to the head of the person 100, such as for use in activities in which the protective headwear 102 will find implementation, including rollerblading, biking, hiking, skateboarding, touch football, soccer, field hockey, girls lacrosse, rock climbing, skiing, snowboarding, and ice-skating, as well as other sports and activities. Other durable and rigid plastics, rigid/semi-rigid elastomers (or rubbers), and/or combinations of various materials can be used to provide impact-resistance from impacts which can cause serious trauma to the head of the person 100.

In some embodiments, the outermost layer 302 is a polycarbonate that can have a thickness of approximately 0.09 inches to provide impact-resistance from accidents, such as during sports or leisure activities. Other thicknesses can be provided based on the activity for which impact-resistance is desired.

The outermost layer 302 includes an arrangement 305 of openings 304. The openings 304 can extend partially or fully through the outermost layer 302 to provide resilient flexibility to the outermost layer 302, thereby reducing a concussive force that potentially can be transmitted through the protective insert 204 to the person 100 as a result of certain impacts (e.g., lacrosse ball).

The openings 304 can be narrow slits spaced apart to allow certain impacts (e.g., lacrosse ball) to decelerate, thereby reducing potential concussive forces to the head. The width of the slits can be from about ⅛' to about ⅜", while the spacing between the slits can be from about ⅛' to about ½". The distance from the edges of the insert 204 to the slits can be about ⅛' to about ½". The height of the slits can be from about ½' to about 1½".

Concerning resilient flexibility, for example, a lacrosse ball that impacts a rigid or semi-rigid protective insert (e.g., outermost layer 302 without openings 304) tends to flatten and spread upon the protective insert, transmitting the potential concussive force through the protective insert to the person. However, the openings 304 in outermost layer 302 of the protective insert 204 enable portions of the ball to at least partially penetrate the openings 304, which allows at least a portion of the outermost layer 302 to flex inwardly and decelerate the ball, thereby reducing the potential concussive force of the impact transmitted through the protective insert 204 to the person 100.

The middle layer 306 can be a pliable rubber (e.g., neoprene) configured to provide cushioning, as well as to mitigate and disperse (or distribute) the impact from the outermost layer 302 about the protective insert 204. Other pliable rubbers, materials and/or combinations or materials can be used. For example, the middle layer 306 can be an elastomer.

The middle layer 306 further provides alternating (non-overlapping) arrangement 309 of openings 308 with the arrangement 305 of openings 304 in the outermost layer 302. The opening 308 can extend partially or fully through the middle layer 306. In some embodiments, the openings 308 can also be air pockets that are internal or embedded in the middle layers 306 (e.g., not extending through surface of the middle layers 306). In some other embodiments, the openings 308 can be omitted.

Specifically, when the layers 302, 304, 306 are assembled into the protective insert 204, the openings 308 provide air pockets between layers 302, 310, which can absorb and disperse the impact from the outermost layer 302 about the protective insert 204. The middle layer 306 can have adhesive surfaces such that layers 302, 306, 310 can be easily sealed with respect to one another to provide the foregoing air pockets. In some embodiments, the outermost layer 302 and the middle layer 306 can be sealed using a process known as overmolding. In such embodiments, the layer 306 can have an adhesive surface to seal against the innermost layer 310. Alternatively or in addition, the innermost layer 310 can have an adhesive surface to seal against the middle layer 306. In various embodiments, the alternating arrangements 305, 309 about the layers 302, 306 can be amended or changed. The shapes and dimensions of the respective openings 304, 308 can be different or the same in the various alternating arrangements 305, 309.

In some embodiments, the middle layer 306 can have a thickness 0.25 inches, 0.125 inches, or another thickness. A portion of the protective insert 204 covered by air pockets from the openings 308 in the alternating arrangement 309 can be larger or smaller than shown in FIG. 3. The openings 308 can have a different arrangement and one or more shapes (e.g., square, rectangular, combination of shapes, etcetera). Alternative thickness, arrangement and/or coverage of openings 308 associated with the middle layer 306 are of course possible.

It is important to note that the alternating arrangement 309 enables formation of air pockets from the openings 308 that cover a portion of the protective insert 204 in order to provide improved absorption and dispersal (or distribution) of the impact from the outermost layer 302 about the protective insert 204. In some embodiments, an additional middle layer (not shown) between layers 306, 310 or between layers 302, 306—having approximately non-overlapping and approximately contiguous openings with the openings 308—can be provided to cover a substantial portion of the protective insert 204 with air pockets, which can further enhance the absorption and distribution (e.g. deflection) of the impact about the at least one protective insert 204, mitigating or eliminating the possibility of serious injury to the head.

The innermost layer 310 is configured to provide additional cushioning and to enclose or seal middle layer 306 between the outermost layer 302 and the innermost layer 310. The innermost layer 310 can be a pliable rubber (e.g., neoprene) and can have a thickness of 0.0625 inch. Other pliable rubbers or other materials can be used. For example, the innermost layer 310 can be an elastomer. The aforementioned additional middle layer can be similar to or different than the middle layer 306.

In various embodiments, the innermost layer 310 can cover the middle layer 306, partially or fully. The innermost layer 310 can cover a certain portion of the middle layer 306, such as a bottom, middle, top or other portion. For example, the innermost layer 310 can cover a bottom portion (e.g., 25% to 50%, or a greater or smaller range) of the middle layer 306. As another example, innermost layer 310 can cover a portion of the middle layer 412 that includes one or more of the openings 308 (e.g., partial or full arrangement 309 of openings 308), such as disposed about the bottom, middle, top or other portion of the middle layer 306.

FIG. 4 illustrates the removable attachment of an example protective insert 204 to an athletic facemask 106 illustrated in FIG. 2.

In embodiments in which the protective athletic headwear 102 is to be secured or attached removeably to a facemask 106, at least one protective insert 204 can include the engagement device 206 configured to removeably engage a linking element 404, which can removeably couple the protective athletic headwear 102 to the facemask 106 (e.g., to a frame member 402 or a strap member of the facemask 106). The strap member of the facemask 106 is shown in and described reference to FIG. 7.

As shown in FIG. 4, the engagement device 206 is a hook (e.g., molded monolithically as part of layer 302 of protective insert 204) and the linking element 104 is a stretchable band 404. One end (or portion) of the linking element 404 engages the engagement device 206, while the other end (or portion) of the linking element 404 wraps about (engages) the frame member 402 of the facemask 106 and engages the engagement device 206, securing removeably and flexibly the protective athletic headwear 102 to the facemask 106. In some embodiments, the engagement device 206 can be a T-shaped member that is coplanar with the layer 302, where each end of the linking element 104 engages a respective portion of the T-shaped member. The flexibility facilitates the positioning and securing of protective athletic headwear 102 with respect to the facemask 106. Similar or different engagement can be provided in relation to the band (FIG. 7) of the facemask 106. It should be noted that other combinations of engagement device/linking element are of course possible, e.g., hook-and-loop devices, buckle devices, snap-button devices, and others known or yet to be developed.

FIG. 5 illustrates a cross-section of the example protective athletic headwear 102 of FIG. 2 with the protective insert 204 disposed in the pocket 205 of the pocket band 201.

As illustrated, the base stitching 203 provides a base to retain the protective insert 204 in the pocket 205 of the pocket band 201. As described previously herein, the protective insert 204 is inserted into the pocket 205 of the pocket band 201 through the opening 202 as illustrated best in FIG. 2.

The opening 202 is stretchable to receive the protective insert 204 into the pocket 205 (e.g., based on the stretchable material from which the protective athletic headwear 102 is made). Accordingly, once the protective insert 204 is received into the pocket 205, the opening 202 can contour about the protective insert 204 to retain or secure the protective insert 204 in the pocket 205.

The body 104 is stretchable and includes a first portion 502 of a first circumference and a second portion 504 of a second circumference. The second circumference of the second portion 504 can be gradually-reduced from the first circumference of the first portion 502. Alternatively, the first and second circumferences of portions 502, 504 can be the same. The first portion 502 extends along the height of the inserts 204, while the second portion 504 extends from the first portion 502 sufficiently to enclose the openings 202 of the pockets 205 in the pocket band 201. In some embodiments, the first portion 502 can continue past base stitching 203 partially along the pocket band 201 to the interior of the protective headwear 102 toward the second portion 504. An edge of first portion 502 past base stitching 203 can be stitched to the pocket band 201 at one or more locations about the pocket band 201.

The overall height of the pocket band 201 can be approximately 4.0 inches, with the first portion 502 being about 3.5 inches and the second portion 504 being about 0.5 inches. Different dimensions for the body 104 can be provided based on, for example, the height of the protective athletic headwear 102 and the thickness and height of the protective inserts 204.

It is noted that the pocket band 201 with the inserted protective insert 204 is free floating with respect to the body 104 of the protective athletic headwear 102, such that the pocket band 201 can provide application-specific or precise fit and positioning of the plural protective inserts 204 for various head sizes to effectively reduce and/or eliminate head injuries, yet provide an aesthetic, comfortable and inexpensive form-factor that can result in increased desirability and usability of protective athletic headwear 102 to mitigate and/or eliminate head injuries.

FIG. 6 illustrates an exploded cross-section of the example protective athletic headwear of FIG. 5 with the protective insert 204 disposed in a pocket 205 of pocket band 201 and a body 104 of the protective athletic headwear stretching over to enclose protective insert 204 in the pocket 205 of pocket band 201.

As aforementioned, the body 104 is stretchable such that the first portion 502 stretches over the pocket band 201 with the inserted protective insert 204, while the second portion 504 stretches over and encloses the openings 202 of the pockets 205 in the pocket band 201 toward the head of the person 100. The second portion can have a lip 602. The lip 602 can be formed by rolling (e.g., folding) and stitching a portion of the body 104 to the interior of the protection headwear 102. The lip 602 can also be formed by finishing (e.g., stitching) the edge of the body 104 using stretchable thread. This can help to enclose the protective inserts 204 in the pockets 205 of pocket band 201.

FIG. 7 illustrates a person 100 wearing the protective athletic headwear 102 of FIG. 1 cutaway to reveal the protective inserts 204 in relation to the body 104 of the protective athletic headwear 102.

Plural protective inserts 204 are secured by the pocket band 201—and more particularly, by the respective pockets 205 of the pocket band 201—around the head of the person 100 and conform or contour to the head of the person 100, providing a protective function to the frontal, parietal, temporal and occipital parts of the person's head. The protective inserts 204 in the respective pockets 205 are enclosed or covered by the body 104. An opening at the top of the protective athletic headwear 102 allows air circulation generally and more particularly allows the person 100 to extend her hair through the open top to the exterior of the protective athletic headwear 102.

The protective inserts 204 provide an almost continuous protective function amongst and between the protective inserts 204, about the protective band 201 of the protective athletic headwear 102.

The engagement device 206 and the linking element 404 enable the person 100 to removeably and flexibly secure the protective athletic headwear 102 to the facemask 106 (e.g., via a frame member 402 or band 702 of the facemask 106). As aforementioned, the flexibility facilitates the positioning and securing of protective athletic headwear 102 with respect to the facemask 106 (e.g., the frame member 402 and/or the strap member 702, etcetera).

FIG. 8 illustrates an impact 802 of a ball 110 to the protective athletic headwear 102 of FIG. 1.

The example impact 802 is delivered by the ball 110 (e.g., lacrosse ball) to the protective insert 204 through the body 104 and the pocket band 201, as illustrated in greater detail in the cutaway of FIG. 9. It is noted that the impact 802 can be delivered by accident or willfully as a result of the ball 110 or lacrosse stick 108 striking the protective athletic headwear 102, or the person falling, hitting, or otherwise being pushed into another person or object.

FIG. 9 illustrates a cross-section of the protective insert of FIG. 3 showing an example protective function in response to the impact 802 of the ball 110 to the protective athletic headwear 102 as illustrated in FIG. 8.

In response to the impact 802 of the ball 110, the outermost layer 302 is configured to deform and flex (e.g. via openings 304) but not to crack or break. The openings 304 enable portions of the ball 110 to at least partially penetrate the openings 304 and flex outermost layer 302, decelerating the impact of the ball 110, thereby reducing the potential concussive force transmitted through the protective insert 204 to the head of the person 100.

The force of the impact 802 is further absorbed and distributed or dispersed through the layers 302, 306, 310. The sealed air pockets 308 in the middle layer 306 distribute or disperse the force of the impact 802 about the protective insert 204. Specifically, the force of the impact 802 cannot fully continue through the air pockets 308. When the air that is sealed (or trapped) in the air pockets 308 is compressed by the impact 802, the air pockets 308 deflect or distribute a portion of the remaining force of the impact 1002 to the surrounding layers 302, 306, 310 that are contiguous to the air pockets 308. The trapped air deforms the pliable middle and innermost layers 306, 310. These layers 306, 310 absorb portions of the force of the impact 802 to provide cushioning to the head of the person 100, while some portions of the force of the impact 802 are also dispersed and spread over the outermost layer 302.

Thus, protective athletic headwear with an open top and a method of manufacturing the protective athletic headwear with an open have been described. Although specific example embodiments have been described, it will be evident that various modifications and changes may be made to these embodiments without departing from the broader spirit and scope of the invention.

Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments shown are described in sufficient detail to enable those skilled in the art to practice the teachings disclosed herein. Other embodiments may be utilized and derived therefrom, such that structural and logical substitutions and changes may be made without departing from the scope of this application.

The foregoing detailed description, therefore, is not to be taken in a limiting sense, and the scope of various embodiments is defined only by the appended claims, along with the full range of equivalents to which such claims are entitled.

Although specific embodiments have been shown and described herein, it should be appreciated that any arrangement calculated to achieve the same purpose may be substituted for the specific embodiments shown. This application is intended to cover any and all adaptations or variations of various embodiments. Combinations of the above embodiments and other embodiments not specifically described herein, will be apparent to those of skill in the art upon reviewing the above description.

The Abstract is provided to comply with 37 C.F.R. §1.72(b) and will allow the reader to quickly ascertain the nature of the technical disclosure of this application. It is submitted with the understanding that it will not be used to interpret or limit the scope or meaning of the claims.

In the foregoing detailed description, various features may be grouped together in a single embodiment for the purpose of streamlining the disclosure of this application. This method of disclosure is not to be interpreted as reflecting that the claimed embodiments have more features than are expressly recited in each claim. Rather, as the following claims reflect, inventive subject matter lies in less than all features of a single disclosed embodiment.

Moreover, it is contemplated that the features or components of various embodiments described herein can be combined into different combinations that are not explicitly enumerated in the foregoing detailed description and that such combinations can similarly stand on their own as separate example embodiments that can be claimed.

The invention claimed is:

1. A protective athletic headwear comprising:
    a body having a first opening and a second opening opposite the first opening, the body configured to fit a head of a person though the first opening;
    a pocket band secured to the body about the first opening and extending to the interior of the body and toward the second opening, the pocket band free floating with respect to the body and configured to fit the head of the person, the pocket band including a plurality of pockets disposed about the pocket band; and
    a plurality of protective inserts configured to be received into the plurality of pockets to provide a protective function to the head of the person, the protective inserts being disposed adjacently to one another about the pocket band and extending toward the second opening such that the body encloses the protective inserts in the pocket band.

2. The protective athletic headwear of claim 1, wherein the body comprises:
    a first portion having a first circumference; and
    a second portion having a gradually-reduced circumference extending from the first circumference to a smaller second circumference.

3. The protective athletic headwear of claim 1, wherein the body includes a lip about the second opening.

4. The protective athletic headwear of claim 1, wherein the body provides a first level of stretchability and the pocket band provides a second level of stretchability.

5. The protective athletic headwear of claim 1, wherein at least one pocket of the plurality of pockets comprises a stretchable opening configured to receive a protective insert of the protective plurality of inserts into the at least one pocket and to retain the protective insert in the at least one pocket.

6. The protective athletic headwear of claim 5, wherein the at least one pocket of the plurality of pockets is defined by a base stitching and a plurality of side stitchings, the base stitching securing the pocket band to the body and the plurality of side stitchings approximating the protective insert.

7. The protective athletic headwear of claim 1, wherein at least one protective insert of the plurality of protective inserts comprises a plurality of sealed air pockets configured to absorb and disperse an impact about the at least one protective insert.

8. The protective athletic headwear of claim 1, wherein the at least one protective insert comprises:
    an outer layer configured to provide impact-resistance; and
    at least one pliable middle layer having at least one arrangement of air pockets configured to absorb and distribute an impact to the outer layer about the at least one protective insert.

9. The protective athletic headwear of claim 8, wherein the outer layer comprises an arrangement of openings configured to enable flexing of the outer layer to decelerate impact on the at least one protective insert.

10. The protective athletic headwear of claim 8, wherein the at least one protective insert comprises:
   at least one arrangement openings in the at least one pliable middle layer;
   a pliable inner layer configured to provide cushioning; and
   wherein the outer layer, the at least one middle layer and the inner layer are sealed such that the openings form the at least one arrangement of air pockets.

11. The protective athletic headwear of claim 10, wherein the inner layer covers at least a portion of the at least one middle layer.

12. The protective athletic headwear of claim 10, wherein an opening of the at least one arrangement of openings extends partially or fully through the at least one middle layer.

13. The protective athletic headwear of claim 8, wherein an air pocket of the at least one arrangement of air pockets is embedded in the at least one middle layer.

14. The protective athletic headwear of claim 8, wherein the outer layer is made of one or more of a thermoplastic, elastomer, and rubber.

15. The protective athletic headwear of claim 8, wherein the at least one pliable middle layer is made of a rubber or an elastomer.

16. The protective athletic headwear of claim 8, wherein the at least one pliable middle layer comprises:
   a first layer having a first arrangement of first openings; and
   a second layer having a second arrangement of second openings, wherein the second arrangement alternates with the first arrangement, such that the first openings and the second openings are approximately non-overlapping and cover a portion of the at least one protective insert.

17. The protective athletic headwear of claim 1, further comprising:
   an engagement device extending from at least one protective insert of the plurality of protective inserts; and
   a linking element configured to couple the at least one protective insert via the engagement device to a facemask.

18. The protective athletic headwear of claim 16, wherein the engagement device is a hook and the linking element is a flexible band that engages a frame member or a strap member of the facemask and secures to the hook.

* * * * *

UNITED STATES PATENT AND TRADEMARK OFFICE
CERTIFICATE OF CORRECTION

| | | |
|---|---|---|
| PATENT NO. | : 8,789,212 B2 | |
| APPLICATION NO. | : 13/840991 | |
| DATED | : July 29, 2014 | |
| INVENTOR(S) | : Cleva | |

It is certified that error appears in the above-identified patent and that said Letters Patent is hereby corrected as shown below:

In the specification

Column 1, line 12:

Now reads:    "which are is incorporated"

Should read:    -- which are incorporated --

Column 1, line 25:

Now reads:    "with an open"

Should read:    -- with an open top --

Column 1, lines 41-42:

Now reads:    "may prefer not wear"

Should read:    -- may prefer not to wear --

Column 1, line 49:

Now reads:    "to not only to"

Should read:    -- not only to --

Signed and Sealed this
Eighth Day of March, 2016

Michelle K. Lee
*Director of the United States Patent and Trademark Office*

CERTIFICATE OF CORRECTION (continued)
U.S. Pat. No. 8,789,212 B2

In the specification

Column 2, line 30:

Now reads:    "person though the"

Should read:    -- person through the --

Column 2, line 60:

Now reads:    "a body having body having a first"

Should read:    -- a body having a first --

Column 3, line 51:

Now reads:    "with an open are"

Should read:    -- with an open top are --

Column 7, line 2:

Now reads:    "protective 204 insert"

Should read:    -- protective insert 204 --

Column 7, line 3:

Now reads:    "four (3)"

Should read:    -- three (3) --

Column 7, line 45:

Now reads:    "about $\frac{1}{8}$' to"

Should read:    -- about $\frac{1}{8}$" to --

Column 7, line 46:

Now reads:    "about $\frac{1}{8}$' to"

Should read:    -- about $\frac{1}{8}$" to --

CERTIFICATE OF CORRECTION (continued)
U.S. Pat. No. 8,789,212 B2

In the specification

Column 7, line 48:

Now reads:    "about ⅛' to"

Should read:    -- about ⅛" to --

Column 7, line 49:

Now reads:    "½' to"

Should read:    -- ½" to --

Column 11, line 37:

Now reads:    "with an open have been"

Should read:    -- with an open top have been --